(12) United States Patent
Reutlinger et al.

(10) Patent No.: US 7,697,826 B2
(45) Date of Patent: Apr. 13, 2010

(54) HAND-GUIDED OR STATIONARY POWER TOOL HAVING A DRIVE UNIT

(75) Inventors: Kurt Reutlinger, Stuttgart (DE); Volker Bosch, Leinfelden-Echterdingen (DE)

(73) Assignee: Robert Bosch GmbH, Stuttgart (DE)

(*) Notice: Subject to any disclaimer, the term of this patent is extended or adjusted under 35 U.S.C. 154(b) by 127 days.

(21) Appl. No.: 11/597,455

(22) PCT Filed: May 3, 2005

(86) PCT No.: PCT/EP2005/052011

§ 371 (c)(1),
(2), (4) Date: Jul. 14, 2008

(87) PCT Pub. No.: WO2005/122386

PCT Pub. Date: Dec. 22, 2005

(65) Prior Publication Data

US 2008/0297080 A1    Dec. 4, 2008

(30) Foreign Application Priority Data

Jun. 5, 2004    (DE)    ............ 10 2004 027 635

(51) Int. Cl.
*H02P 5/00*    (2006.01)

(52) U.S. Cl. .................. 388/800; 388/937; 388/815; 388/821

(58) Field of Classification Search .......... 388/800, 388/806, 815, 821–823, 937; 318/432, 800, 318/802

See application file for complete search history.

(56) References Cited

U.S. PATENT DOCUMENTS

| | | | | |
|---|---|---|---|---|
| 4,081,704 | A * | 3/1978 | Vassos et al. | 310/50 |
| 5,440,215 | A * | 8/1995 | Gilmore | 318/432 |
| 5,747,953 | A * | 5/1998 | Philipp | 318/139 |
| 6,960,844 | B1 * | 11/2005 | Al-Hosini et al. | 307/131 |
| 2003/0089511 | A1 | 5/2003 | Tsuneda et al. | |
| 2004/0021437 | A1 | 2/2004 | Maslov et al. | |
| 2004/0022527 | A1 * | 2/2004 | Carusillo et al. | 388/800 |

FOREIGN PATENT DOCUMENTS

| | | |
|---|---|---|
| CN | 1418760 | 5/2003 |
| DE | 40 21 098 | 1/1991 |
| DE | 101 14 973 | 10/2002 |
| DE | 102 28 129 | 5/2003 |
| EP | 0 884 834 | 12/1998 |

* cited by examiner

*Primary Examiner*—Rina I Duda
(74) *Attorney, Agent, or Firm*—Kenyon & Kenyon LLP

(57) ABSTRACT

A hand-guided or stationary power tool has a drive unit having a motor that includes a rotor having a permanent magnet and a stator and has a motor control designed to trigger the motor in a first rotational speed range according to a voltage-controlled mode and to trigger the motor in a second rotational speed range following the first rotational speed range in the direction of a higher rotational speed according to a field-weakening operation.

14 Claims, 2 Drawing Sheets

HAND-GUIDED OR STATIONARY POWER TOOL HAVING A DRIVE UNIT

FIELD OF THE INVENTION

The present invention relates to a hand-guided or stationary power tool having a drive unit, in particular a battery-operated power tool, e.g., a cordless screwdriver.

BACKGROUND INFORMATION

There are various known power tools that may be operated using an electric motor. In some cases these power tools are provided with EC motors that are brushless, i.e., the rotor is provided with permanent magnets that rotate in a magnetic field generated by stator coils. The rotational speed of the EC motor is usually controlled via the applied motor voltage.

The motor voltage is usually applied by pulse width modulation of the power transistors of the drive unit. In doing so, the motor is commutated as a function of fixed rotor positions. The EC motor is usually designed for the maximum rotational speed of the power tool. Because this is usually associated with a lower number of required windings, it results in a comparatively low torque in relation to the stator current. This current is determined by the limiting values of the power electronics, the motor and/or the battery. The torque is thus also limited to this maximum value over the entire rotational speed range.

This behavior is unfavorable for use of such EC motors in power tools. In this situation, it is often necessary for a high torque to be available at a low rotational speed and for a low torque to be available at a high rotational speed. With today's power tools, this is achieved by providing reversible gears with which a high torque at a high rotational speed is converted into a lower rotational speed of the tool to achieve a high torque at a lower rotational speed. However, it is complex and expensive to provide a reversible gear, which also results in friction losses that increase the power tools' power consumption.

In the past, power tools have been designed for a high rotational speed, so the stator coils have a low ohmic resistance and a lower inductance, which may result in a relatively high current when the coils are short-circuited, and consequently the motor or the electronics may be damaged. In the event of a fault or an inadmissible operating state, which may occur, for example, when a battery is removed from a battery-operated power tool when the motor is rotating, the motor and/or the electronics may be destroyed due to short circuiting of the motor. For this reason, measures are usually provided to prevent damage to the motor.

An object of the present invention is to provide an improved power tool that meets the requirements of a high torque at a lower rotational speed and a lower torque at a high rotational speed without using a reversible gear and whereby the power tool is more resistant to damage due to faults or inadmissible operating states.

SUMMARY OF THE INVENTION

According to the present invention, a power tool having a drive unit is provided, including a motor having a rotor with a permanent magnet and a stator. The drive unit also has a motor control designed to trigger the motor in a first rotational speed range according to a voltage-controlled mode and to trigger the motor in a second rotational speed range following the first rotational speed range in the direction of a higher rotational speed according to a field-weakening operation.

With the power tool according to the present invention, the motor rotational speed is to be adjusted via the voltage-controlled mode as well as via the field-weakening operation. This has the advantage that the motor no longer needs to be designed electrically for a maximum rotational speed but instead may be designed for a medium rotational speed, so that a correspondingly higher torque may be achieved at the same maximum voltage in the range up to the medium rotational speed than with a traditional motor designed for a higher rotational speed. Higher torques are thus possible in the lower (first) rotational speed range. The motor is operated in field-weakening operation to achieve a high rotational speed beyond the medium rotational speed. In field-weakening operation, there is a change in the phase relation of the rotor field and the stator field, so that the rotational speed may be increased to a rotational speed that is higher than the maximum rotational speed in voltage-controlled operation. The higher rotational speed is achieved at a reduced torque in comparison with the torque at the maximum voltage. This operating performance is advantageous for power tools because they require either a high torque at a low rotational speed or a high rotational speed at a low torque. The drive unit may thus cover working ranges which are possible with conventional drives or conventionally operated EC motors only by using corresponding reversible gears.

Due to the motor being designed for a comparatively low motor rotational speed, i.e., a motor rotational speed lower than the maximum rotational speed at which the power tool is to be operated at maximum speed, the resistance and inductance of the stator winding are higher in comparison with those of a traditional power tool. The stator winding may thus be designed to be short-circuit-proof. The motor may thus be short-circuited by the electronics for immediate stoppage in any operating state without the risk of damaging the motor or electronics due to short-circuit currents. In a fault scenario or in inadmissible operating states caused by sudden removal of the power supply when the motor is rotating, for example, short-circuiting of the motor by the power electronics of the drive is thus sufficient to leave the dangerous operating states by the fastest way possible.

In field-weakening operation, the time characteristic of the motor currents approaches the sinusoidal form increasingly and thus reduces the increased pulsation losses in the magnet and iron of the motor, so the power tool may be operated more efficiently.

Another advantage is that the stator windings are provided with a large number of windings so that a smaller wire diameter may be selected for the windings, thereby simplifying production of the motor.

According to one specific embodiment of the present invention, the motor control applies a voltage to the motor in voltage-controlled mode to preselect the rotational speed of the motor. The first rotational speed range is determined by the range between 0 and the medium preselected rotational speed, which is achieved by applying a maximum voltage in voltage-controlled mode.

The motor control of the power tool may have a phase shifter to adjust field-weakening operation through the phase shift between the stator magnetomotive force and the rotor magnetomotive force. The phase shifter may be designed in particular to adjust the phase between the stator magnetomotive force and the rotor magnetomotive force (between electric loading of the stator and electric loading of the rotor) to be greater than 90° in field-weakening operation.

According to a preferred specific embodiment, the power tool has a power supply in the form of a rechargeable battery. In particular, the power tool may be designed as a cordless screwdriver, whereby a shaft of the motor is coupled to a machining tool by a gear having a fixed gear ratio, i.e., the power tool is designed without a reversible gear.

DETAILED DESCRIPTION

Figure 1:
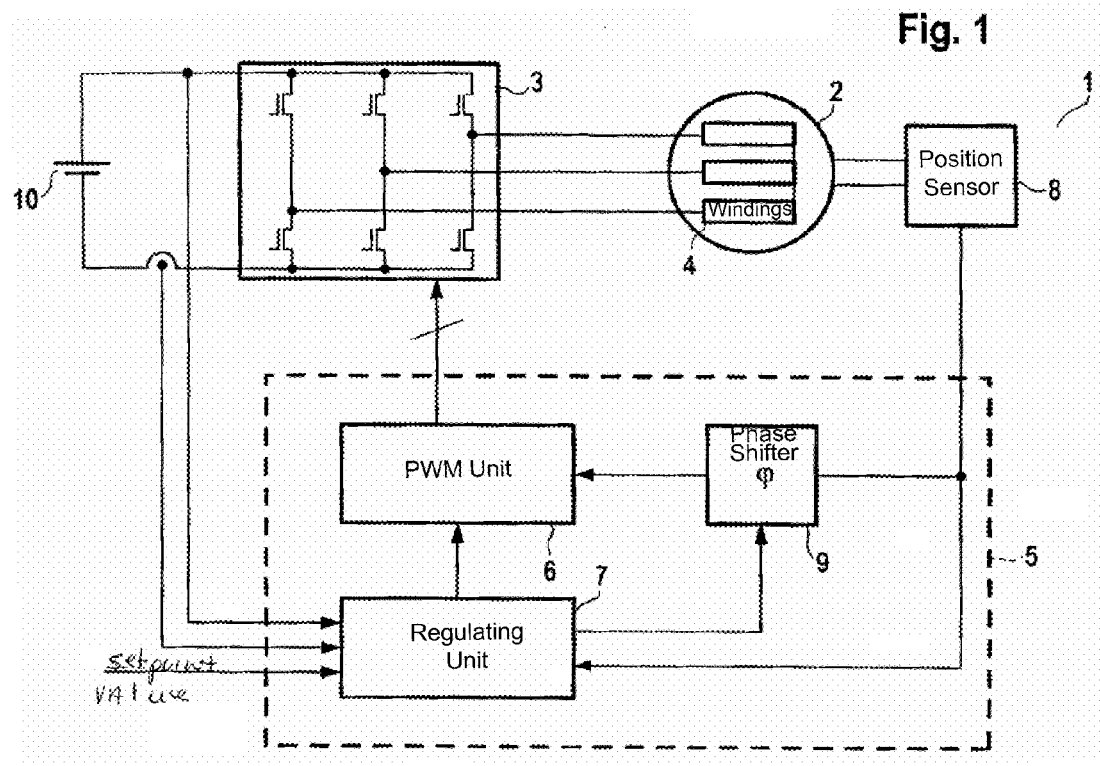
FIG. 1 shows a block diagram of a drive unit for a power tool.

FIG. 1 shows a drive unit 1 for a power tool, in particular for a battery-operated power tool, in particular a cordless screwdriver. The drive unit has a motor 2 which is supplied with power via power electronics 3. Motor 2 is triggered by pulse-width-modulated voltage pulses generated with the help of transistor bridges, producing an effective voltage on motor 2. Motor 2 is designed as a three-phase motor having three stator windings 4, each triggered by one of the transistor bridges.

Power electronics 3 is triggered via a motor control 5, generating PWM triggering signals for power electronics 3 in a PWM unit 6. PWM triggering signals are set in PWM unit 6 as a function of the position of a rotor (not shown) of motor 2 and as a function of a setpoint value externally preselected with the help of a regulating unit 7.

The setpoint value is directly or indirectly preselected by a user with the help of an operating element.

The position of the rotor of motor 2 is measured by a position sensor 8 so that information about the absolute position of the rotor is available in regulating unit 7. Position sensor 8 measures the position either absolutely or in relation to a previous position, the absolute position being determined in regulating unit 7 in this case via the changes in position.

Regulating unit 7 is designed in such a way that two modes are implemented. In a first mode, motor 2 is triggered according to a voltage-controlled mode, so that the rotational speed, in particular the rotational speed at no load or at a constant load, is proportional to the effective voltage applied via power electronics 3. In a second mode, which is determined by a rotational speed range above a preselected rotational speed, regulating unit 7 switches to the so-called field-weakening operation during regulating the power electronics for triggering motor 2. A phase shifter 9 is provided for this purpose, ensuring that the phase relation between the rotor field supplied by the rotor and the exciting field created by the stator is greater than 90°, the degree of phase shifting determining the rotational speed.

Motor control 5 may be designed in the form of a microcontroller supplying the triggering signals of power electronics 3. Drive unit 1 may be supplied with power via a battery 10, in particular a rechargeable battery. Regulating unit 7 may continue to detect the stator currents and the voltages in power electronics 3 to obtain information about the load applied to motor 2.

Figure 2:
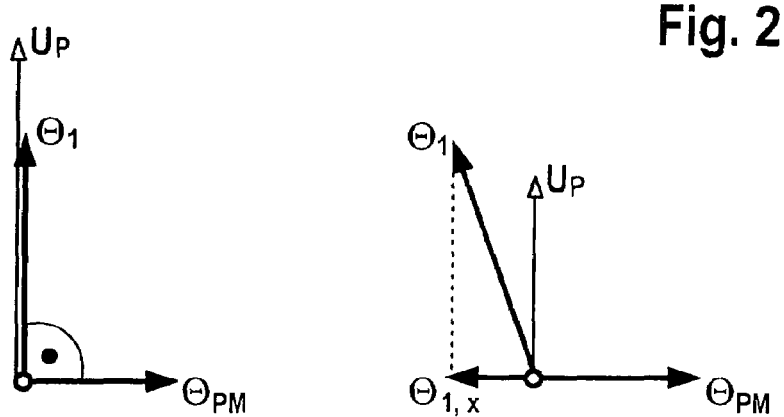
FIG. 2 shows vector diagrams to illustrate voltage-controlled operation and field-weakening operation.

FIG. 2 shows vector diagrams for the stator and rotor magnetomotive force for voltage-controlled operation as well as for field-weakening operation. The vector diagram on the left represents the status in voltage-controlled operation. In this mode, the maximum achievable motor rotational speed is fixedly preselected by the level of the supply voltage applied to the power electronics. The vector of the stator current and/or stator magnetomotive force $\theta_1$ is thus almost perpendicular to the vector of the magnetic equivalent magnetomotive force of rotor $\theta_{PM}$. The rotational speed may be adjusted almost proportionally by varying the applied voltage on the stator windings.

The vector diagram on the right side of FIG. 2 represents the status in a field-weakening operation. The vector of stator magnetomotive force $\theta_1$ and the vector of magnetic equivalent magnetomotive force $\theta_{PM}$ of the rotor are no longer mutually perpendicular but instead the stator and rotor magnetomotive force each now have an angle of much more than 90°. When the stator magnetomotive force is broken down vectorially into a component parallel to the rotor magnetomotive force (X axis) and a component perpendicular to that (Y axis), it is thus apparent that the X-axis component of stator magnetomotive force $\theta_{1,x}$ is opposite the rotor magnetomotive force and thus diminishes its effect. This effect is a reduction in synchronized internal voltage. The operative mechanism corresponds to the mechanism known from a separately excited d.c. shunt-wound machine. If the excitation strength is reduced during operation of the machine, this causes a reduction in the rotationally induced armature voltage, resulting in an increase in armature current and thus an accelerating torque. The machine accelerates until the induced voltage and the voltage drop on the armature resistance are in equilibrium with the feed voltage. This allows the rotational speed of the d.c. machine to increase.

Figure 3:
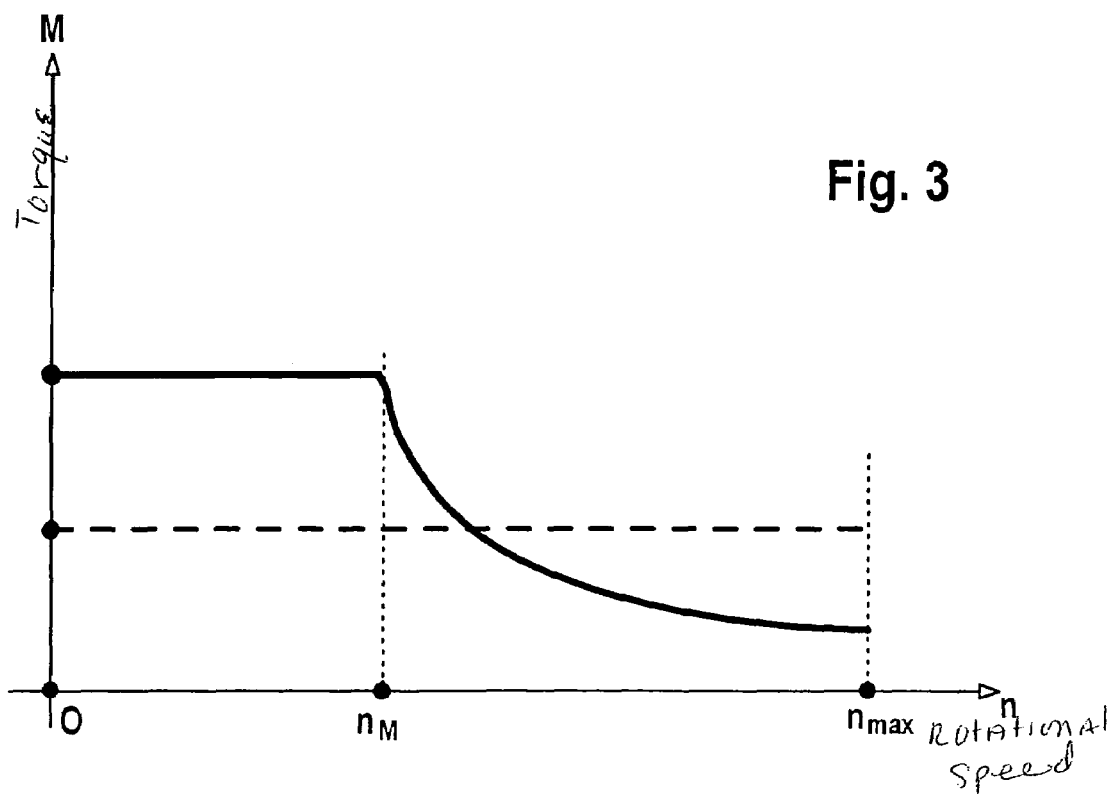
FIG. 3 shows a diagram to illustrate the plot of torque as a function of rotational speed with a traditional power tool and with a power tool according to one specific embodiment of the present invention.

FIG. 3 shows the curves of torque as a function of motor rotational speed. With a traditional drive unit (dashed line) for a power tool of a conventional design having an EC motor, the available torque is largely constant up to the maximum torque, because it is determined by the current limit of the electronics and the motor.

With the power tool according to the present invention (solid line), the voltage-controlled mode is likewise selected in a first rotational speed range, with the motor of the power tool being designed to obtain the maximum torque at a medium rotational speed nm, determined by the maximum available power and/or the maximum permissible current limit. As a result, a higher torque is available at the same current level than with a traditional power tool even at a lower rotational speed in the range of 0 to $n_M$ because of the greater number of windings. In the second rotational speed range, i.e., at a rotational speed between $n_M$ and $n_{Max}$ (maximum rotational speed), the motor is operated in field-weakening operation in which a lower torque is available than the maximum torque achieved at a medium rotational speed. The greater the rotational speed of the motor, the lower the torque, decreasing inversely proportionally until reaching maximum rotational speed $n_{Max}$.

The torque characteristic curve corresponds to a characteristic curve which is very suitable for operation of power tools. In traditional power tools, such a characteristic curve is usually achieved by using a gear having reversible gear ratios, which provides high torques in the lower rotational speed range and lower torques in the high rotational speed range. The power tool according to the present invention therefore has the advantage that it may be designed without a reversible gear and therefore the friction losses due to the gear may be avoided. Furthermore, such a power tool allows a sturdier design of the stator windings, which may be short-circuited in any operating state by the electronics due to their greater resistance and inductance without the risk of damage to the motor or electronics. The higher resistance and inductance result from the fact that, at a given maximum voltage in voltage-controlled operation, the motor may be designed for a lower rotational speed because the higher rotational speed is achievable via field-weakening operation.

What is claimed is:

1. A power tool, the power tool being one of hand-guided and stationary, the power tool comprising:
   a drive unit including:
      a motor including a rotor having a permanent magnet, and a stator; and
      a motor control for triggering the motor in a first rotational speed range according to a voltage-controlled mode and for triggering the motor in a second rotational speed range following the first rotational speed range in a direction of a higher rotational speed according to a field-weakening operation;
   wherein the motor control has a phase shifter to adjust a phase between a stator magnetomotive force and a rotor magnetomotive force in field-weakening operation.

2. The power tool according to claim 1, further comprising an operating element for preselecting a rotational speed at no load.

3. The power tool according to claim 1, wherein the motor control applies a voltage to the motor in the voltage-controlled mode to preselect a rotational speed of the motor, the first rotational speed range being determined by a range between 0 and a medium rotational speed, which is achieved by applying a maximum voltage in the voltage-controlled mode.

4. The power tool according to claim 1, wherein the phase shifter adjusts the phase between the stator magnetomotive force and the rotor magnetomotive force to be greater than 90° in field-weakening operation.

5. The power tool according to claim 1, further comprising a power supply in the form of a rechargeable battery.

6. The power tool according to claim 5, wherein the power tool is a cordless screwdriver.

7. The power tool according to claim 1, wherein the motor further includes a shaft coupled directly to a machining tool.

8. A method for operating a drive unit for one of a hand-guided and stationary power tool, the drive unit including a motor which includes a rotor having a permanent magnet, and a stator, the method comprising:
   triggering the motor according to a voltage-controlled mode in a first rotational speed range and according to a field-weakening operation in a second rotational speed range that follows the first rotational speed range in a direction of a higher rotational speed; and
   adjusting a phase, via a phase shifter, between a stator magnetomotive force and a rotor magnetomotive force in field-weakening operation.

9. The method according to claim 8, further comprising preselecting a rotational speed at no load.

10. The method according to claim 8, further comprising:
    applying a voltage to the motor in the voltage-controlled mode to preselect a rotational speed of the motor, the first rotational speed range being determined by a range between 0 and a medium rotational speed, which is achieved by applying a maximum voltage in the voltage-controlled mode.

11. The method according to claim 8, wherein the phase shifter adjusts the phase between the stator magnetomotive force and the rotor magnetomotive force to be greater than 90° in field-weakening operation.

12. The method according to claim 8, wherein the power tool includes a power supply in the form of a rechargeable battery.

13. The method according to claim 12, wherein the power tool is a cordless screwdriver.

14. The method according to claim 8, wherein the motor further includes a shaft coupled directly to a machining tool.

* * * * *